W. J. BLACK.
AUTOMATIC TRANSFER FOR DUMP CARS.
APPLICATION FILED JULY 15, 1918.
Reissued June 29, 1920.
14,901.
4 SHEETS—SHEET 1.
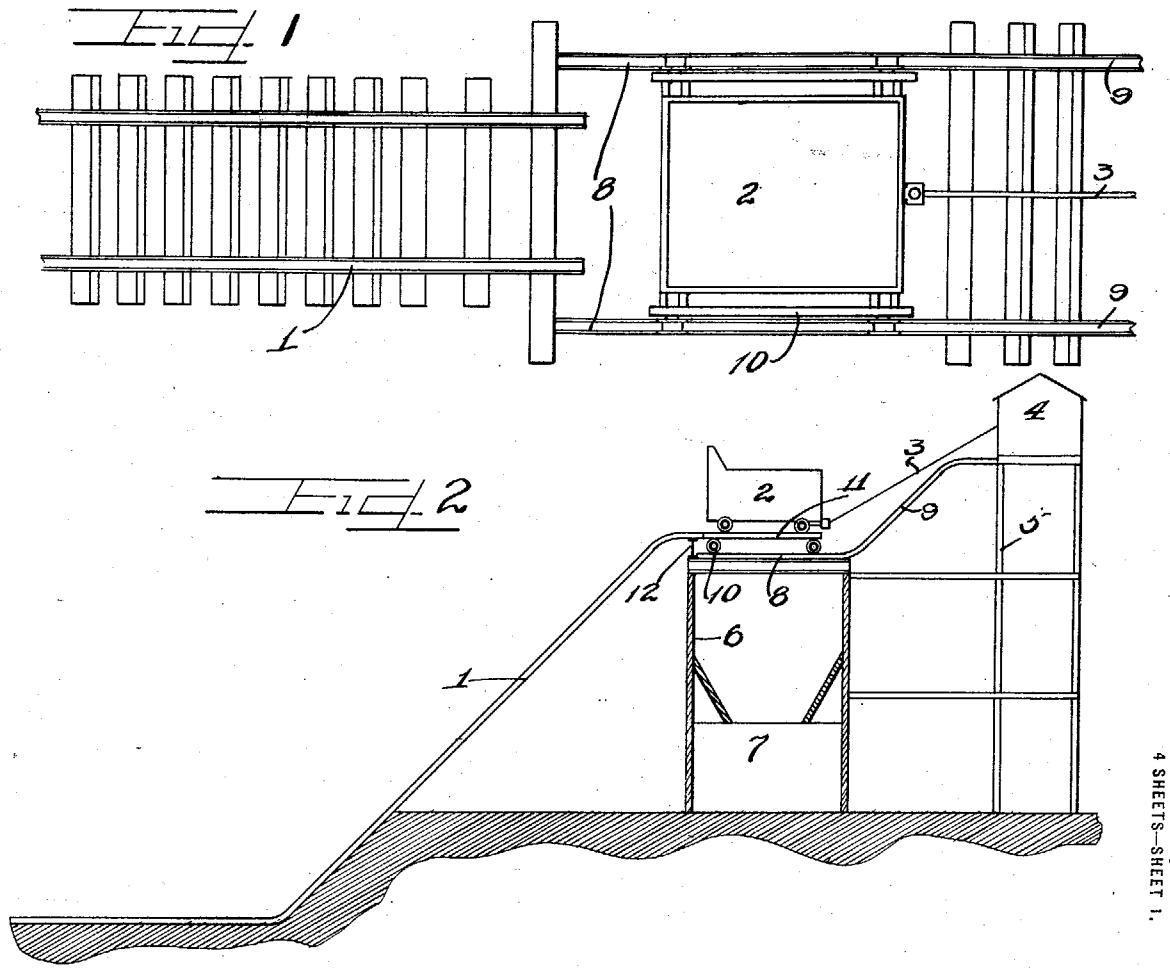
Witnesses
Rudolph T. Berg.
Charles Wolf Jr.
Inventor
William J. Black.
By Charles E. Wilson Atty.

W. J. BLACK.

AUTOMATIC TRANSFER FOR DUMP CARS.

APPLICATION FILED JULY 15, 1918.

Reissued June 29, 1920.

14,901.

4 SHEETS—SHEET 2.

Witnesses

Rudolph J. Berg.

Charles W. Fields Jr.

Inventor

William J. Black.

By Charles E. Wilder Atty.

W. J. BLACK.

AUTOMATIC TRANSFER FOR DUMP CARS.

APPLICATION FILED JULY 15, 1918.

Reissued June 29, 1920. 14,901.

4 SHEETS—SHEET 3.

Witnesses

Rudolph J. Berg.

Charles W. Hills Jr.

Inventor

William J. Black.

By Charles E. Wise Atty.

W. J. BLACK.

AUTOMATIC TRANSFER FOR DUMP CARS.

APPLICATION FILED JULY 15, 1918.

Reissued June 29, 1920.

14,901.

4 SHEETS—SHEET 4.

Witnesses

Rudolph T. Berg.

Charles Fielb Jr.

Inventor

William J. Black.

Charles Neill

Atty.

UNITED STATES PATENT OFFICE.

WILLIAM J. BLACK, OF CHICAGO, ILLINOIS.

AUTOMATIC TRANSFER FOR DUMP-CARS.

14,901. Specification of Reissued Letters Patent. Reissued June 29, 1920.

Original No. 1,249,305, dated December 11, 1917, Serial No. 137,380, filed December 16, 1916. Application for reissue filed July 15, 1918. Serial No. 245,109.

*To all whom it may concern:*

Be it known that I, WILLIAM J. BLACK, a citizen of the United States, and a resident of the city of Chicago, in the county of Cook and State of Illinois, have invented certain new and useful Improvements in Automatic Transfers for Dump-Cars; and I do hereby declare that the following is a full, clear, and exact description of the same, reference being had to the accompanying drawings, and to the numerals of reference marked thereon, which form a part of this specification.

Heretofore, where dump cars have been used in quarries and in other instances, the material discharged from the dump car often strikes the track rails as it is dumped from the car to the receiving means provided below the track. It has been found, particularly where the dump car is drawn upwardly over an inclined track, to a position over a crusher, that the large pieces of stone or other material of considerable weight, when dumped from the car by elevating the car upwardly on the inclined track, strike the track rails over which the car has been drawn, and often break or fracture the same. In fact, the occurrence is so frequent as to seriously interrupt operation of the apparatus.

It is an object therefore of this invention to provide a dump construction whereby dump cars are run upon a transverse truck which is drawn with the dump car upwardly on a dumping incline thereby leaving an open space of considerable width for discharge of the material rearwardly of the truck, between the spaced rails on which the transfer truck moves, so that there is no likelihood of the material discharged striking the spaced rails on which the transfer truck is mounted.

It is also an object of this invention to provide a dump construction comprising an inclined track leading upwardly to a horizontal dumping platform with the crusher disposed therebeneath and with widely spaced rails on said platform on which a transfer truck is mounted. Said transfer truck is provided with rails in register with the inclined track rails so as to receive the dump car thereon and to move bodily with the dump car upwardly on widely spaced inclined rails to permit discharge of the contents of the dump car into the space between the rails of the transfer truck at the horizontal platform for discharge downwardly to the crusher.

It is also an object of this invention to provide a dumping construction embracing an inclined track for a dump car leading to a horizontal dumping platform on which a transfer truck is mounted to roll upwardly upon a suitable incline, and with auxiliary rails mounted upon the truck adapted to receive the dump car drawn thereon and thereafter to permit movement of the transfer truck with the dump car upwardly on the incline so that the contents of the dump car will be discharged therefrom through a space in the horizontal platform to suitable receiving means.

It is furthermore an important object of this invention to construct a dump construction for a dump car wherein the dump car moves upon a transfer truck which thereafter moves automatically with the dump car upwardly into a dumping position for the dump car, and after the dumping operation, carries the dump car downwardly and locks in a fixed position permitting the dump car to continue its course downwardly over rails provided therefor to receive another charge of material.

It is finally an object of this invention to provide a dump construction wherein the dump car is moved onto a transfer truck and automatically locked therewith and acts automatically to release the transfer truck for movement, whereby the car is conveyed upon the truck to dumping position and thereafter returned upon the truck, the car then acting automatically to permit locking of the truck in position and release of the car from the truck, whereby the car may proceed onwardly off of the truck to receive another charge of material.

The invention (in a preferred form) is illustrated in the drawings and hereinafter more fully described.

On the drawings:

Figure 1 is a top plan view of a track and dump car construction embodying the principles of my invention.

Fig. 2 is a side elevation thereof.

As shown in the drawings:

Figure 3:
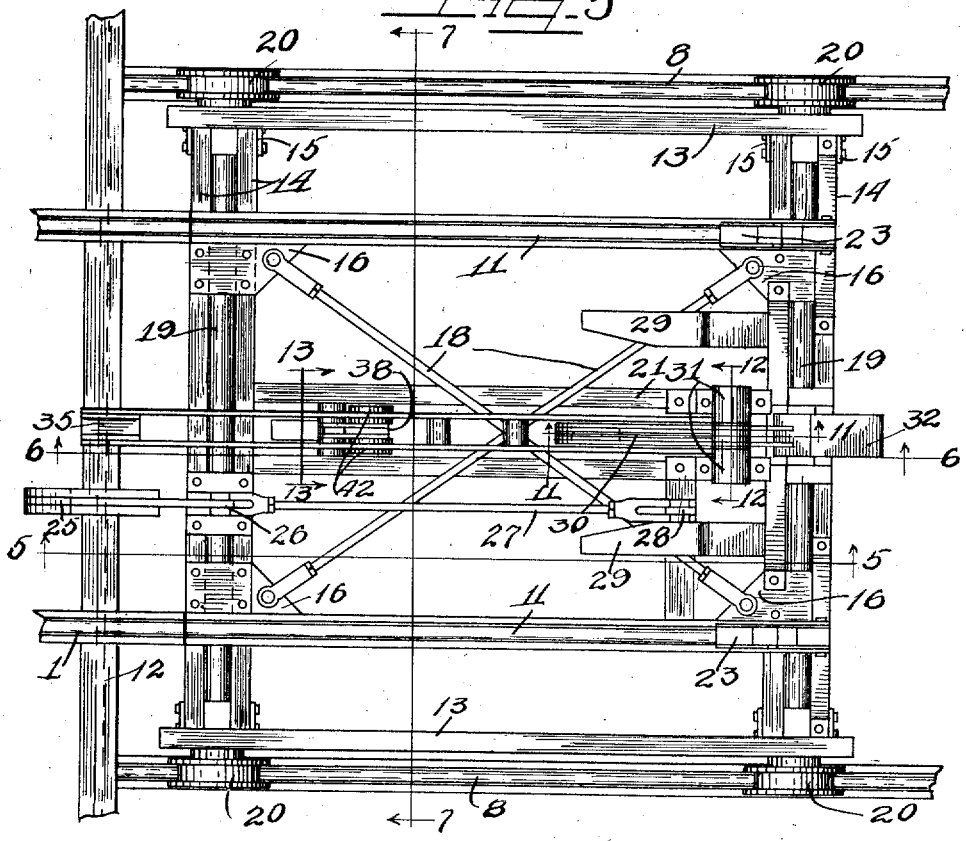
Fig. 3 is a top plan view of the transfer truck.

The reference numeral 1, indicates an upwardly inclined track, over which a dump car, denoted as a whole by the reference numeral 2, is adapted to be drawn by a cable 3, attached to the forward end of the dump car, and leading upwardly into a shed structure 4, built upon a framework 5, within which suitable power driven winch mechanisms are provided to draw the dump car upwardly. The upwardly inclined track 1, terminates at its upper end at a horizontal platform which is built at the upper end of a receiving means into which the material from the dump car is discharged. Built upon the horizontal platform portion at the upper end of the receiving pit structure 6, are track rails 8, the gage of which, as clearly shown in Fig. 1, is considerably greater than the gage of the track rails 1, and said track rails 8, are inclined upwardly at one side of the receiving pit, as denoted by the reference numeral 9, leading upwardly toward the shed structure 4, within which the power mechanisms are mounted.

As clearly shown in Figs. 1 and 2, a truck, denoted by the reference numeral 10, is mounted upon the track rails 8, and is provided with supplementary track rails 11, which, when the truck is on said rails 8, register with the upper end of the track rails 1, which are disposed above the track rails 8, supported upon a transverse I-beam 12, so that the dump car 2, drawn upwardly on the track rails 1, is drawn over and upon the track rails 11, of the truck 10. Mechanisms are provided for locking the truck 10, in position upon the rails 8, until the dump car 2, is received thereon, then releasing the same and automatically locking the dump car upon the truck so that the associated truck and dump car may be hauled upwardly on the inclined track rails 9, and the contents of the dump car 2, discharged from the rear end thereof into the pit structure 6, between the widely spaced rails 8.

Figure 5:
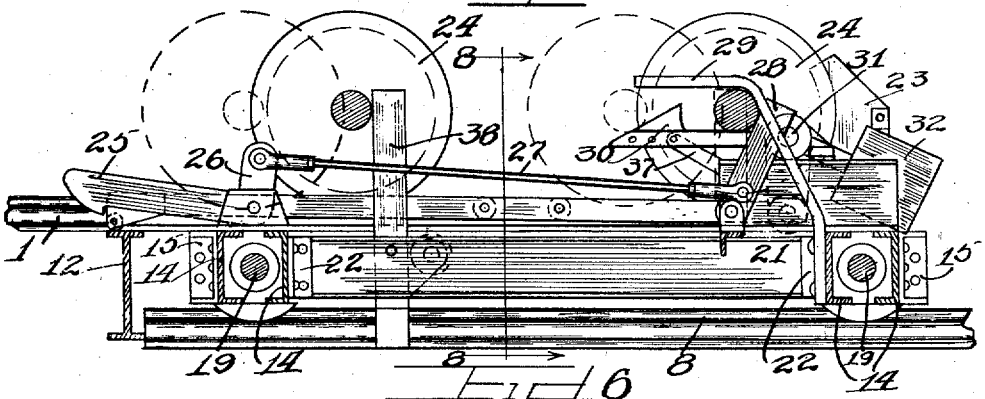
Fig. 5 is a longitudinal section taken on line 5—5 of Fig. 3, with parts omitted and parts shown in elevation.
Figure 6:
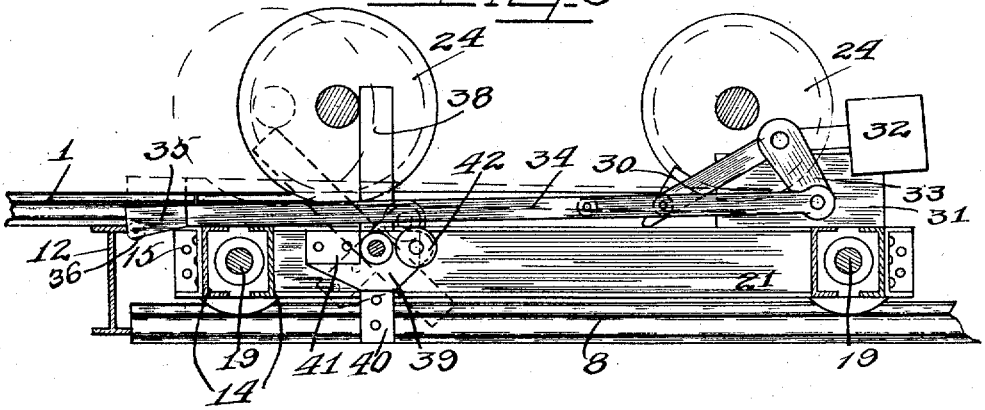
Fig. 6 is a section on line 6—6 of Fig. 3.
Figure 7:
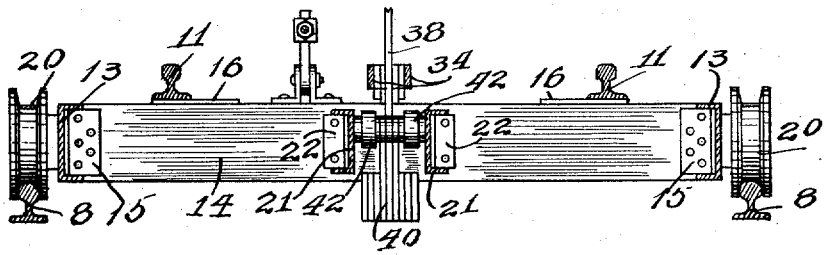
Fig. 7 is a detail section taken on line 7—7 of Fig. 3.
Figure 8:
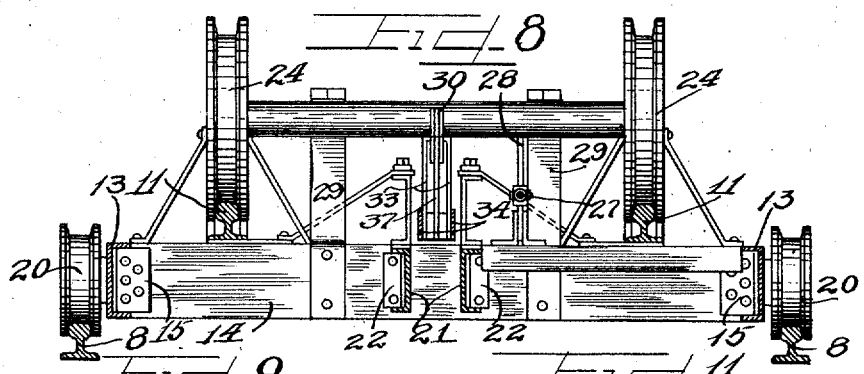
Fig. 8 is a sectional detail taken on line 8—8 of Fig. 5.
Figure 9:
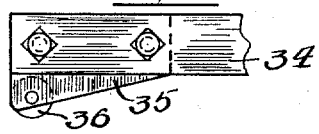
Fig. 9 is a detail side view of the end of the stop lever for the truck.

The truck 10, consists of channel side sills 13, and built up end sills, each of which consists of two channels 14, faced toward one another as shown in Figs. 5 and 6, and with the end sills secured to the side sills by angle corner bracket plates 15. Plates 16, are secured upon the top surface of the respective end sill channels 14, as shown clearly in Figs. 3 and 7, and secured on said plates 16, and extending longitudinally of the truck in parallel relation, are the track rails 11, of the same gage and adapted to register with the track rails 1. A pair of diagonally disposed truss rods 18, are connected between the respective bracket plates 16, as shown clearly in Fig 3. Journaled within the end sill channel members 14, as clearly shown in Figs. 3 and 5, are axles 19, and on the outer ends thereof are rollers or wheels 20, adapted to roll upon the track rails 8—9. Extending centrally and longitudinally of the truck frame, are intermediate channel sills 21, having their ends secured to the interior surface of the end sills by bracket plates 22.

Figure 4:
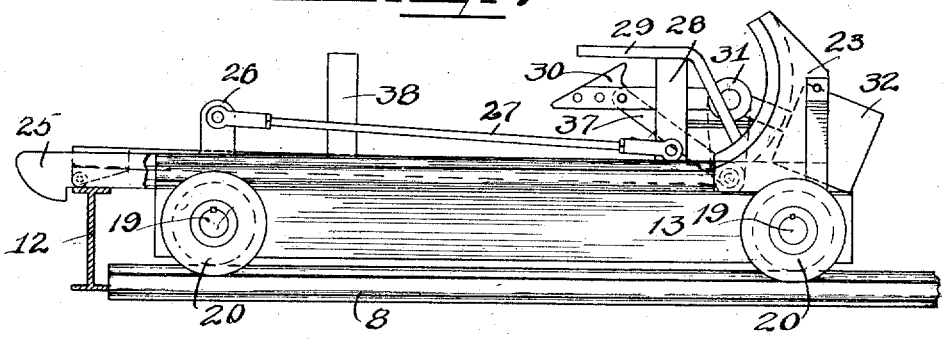
Fig. 4 is a side elevation thereof.

As clearly shown in Figs. 3 and 4, abutment members 23, curved on their inner surface, are mounted upon the ends of the track rails 11, to receive the front wheels 24, of the dump car seated therein when the dump car is drawn upon the truck in the manner shown in Fig. 2. The entire truck 10, is held secured in latched position by a latch lever 25, which, as shown in Fig. 4, engages over the upper end of the transverse I-beam 12. Said latch lever 25, is pivoted upon the rear end sill of the truck and is provided with a tail lever extension 26, to which is connected a long actuating link or rod 27. The forward end of said actuating link or rod 27, is pivotally connected to the lower end of a normally upright lever 28, which is adapted to be struck by the front axle of the dump car, as shown in Fig. 5, and tilted forwardly, thereby pulling the latch lever 25, upwardly through the intermediate link 27, to release the truck for movement. Upwardly extending and rearwardly bent bars 29, are secured to the front end sill of the truck, and are positioned to receive the front axle of the dump car engaged therebeneath, as clearly shown in Fig. 5, to hold the dump car to the truck, and prevent tilting of the same therefrom when the associated truck and dump car are drawn upwardly upon the inclined track rails 9.

Mechanisms are also provided for positively holding the dump car upon the truck co-acting with bars 29, for the purpose. This mechanism comprises a latch lever or hook member 30, shown in Figs. 4 and 5, adapted to engage behind the front axle of the dump car. The latch lever 30, is pivotally mounted upon upright bearing members 31, secured on the forward end of the intermediate longitudinal sills 21, and is provided with a counterweight 32, which acts normally to hold the latch lever 30, upwardly in a position shown in Figs. 4 and 5. Said latch lever 30, and counter-weight lever 32, have rigidly associated therewith a downwardly extending crank 33, and pivotally connected to the end thereof is a long link or lever 34, consisting of a pair of flat bars spaced apart and leading rearwardly of the truck, and at its rear end having a plate 35, bolted between the flat bars, with a roller 36, journaled therein.

Figure 11:
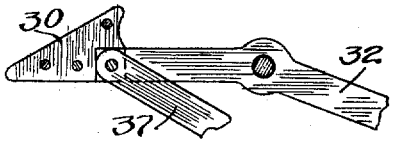
Fig. 11 is a sectional detail taken on line 11—11 of Fig. 3.
Figure 10:
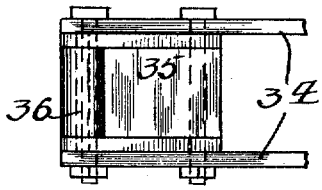
Fig. 10 is a bottom plan view thereof.
Figure 12:
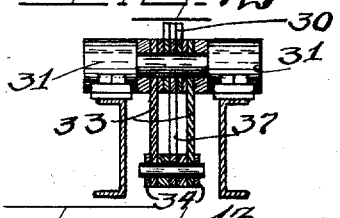
Fig. 12 is a detail section on line 12—12 of Fig. 3.
Figure 14:
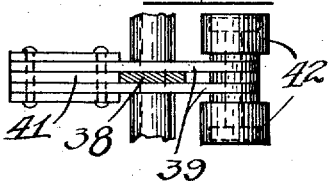
Fig. 14 is a section on line 14—14 of Fig. 13.
Figure 13:
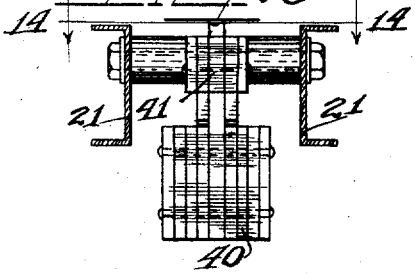
Fig. 13 is a detail section on line 13—13 of Fig. 3.

A link 37, as shown in Figs. 4 and 11, is connected between the latch lever 30, and the downwardly directed crank 33. The plate 35, is adapted to abut against the upper end of the transverse I-beam 12, when the truck moves rearwardly after a dumping operation to thereby cause actuation of the crank 33, as shown in Fig. 6, to swing the latch lever 30, downwardly, and release the front axle of the dump car for movement of the dump car off of the transfer truck. To receive the car for the next dumping operation, a normally upright lever 38, is journaled on a pintle shaft secured between the intermediate longitudinal sills 21, and has attached thereto bars or plates 39, on each side thereof, and at its extreme lower end is provided with a counterweight 40, consisting of a series of built-up plates which act normally to hold said lever 38, in upright position. Secured on one end of the bars 39, as shown in Fig. 14, are a series of plates affording another counterweight 41, and on the other end of said bars 39, are journaled spaced rollers 42, spaced apart the same distance as the bars 34, which constitute the connecting lever between the crank arms 33, and the spacing abutment plate 35. Said rollers 42, are adapted to be swung upwardly by a rearward movement of the lever 38, beneath the bars 34, to elevate the same and permit the roller 36, to track over the top surface of the transverse I-beam 12, as shown in Fig. 5, permitting the latch lever 30, to swing upwardly into normal latching position.

The operation is as follows:

The dump car 2, is hauled upwardly on the inclined track rails 1, by the cable 3, and moved into horizontal position upon the transfer truck 10, as shown in Fig. 2. As the dump car 2, moves onto the transfer truck, the front axle of the dump car strikes the latch lever 30, as shown in dotted lines in Fig. 5, to depress the same, thereby elevating the counterweight 32, and continuing its movements, strikes against the lever 28, which, through the link 27, serves to elevate the latch lever 25, to release the transfer truck 10, from the stationary transverse I-beam 12. The track rails 11, mounted upon the transfer truck are, of course, in register with the track rails 1, whereby the dump car is permitted to be drawn onto the transfer truck, and by so moving, the front wheels 24, of the dump car, move against the abutments 23, on the transfer truck, the front axle thereof moving beneath the bent bars 29. The continued draft upon the cable 3, serves to draw the associated transfer truck and dump car upwardly upon the inclined track rails 9, on which the rollers or wheels 20, of the transfer truck move. As a consequence, as the associated dump car 2, and transfer car are drawn upwardly upon the inclined rails 9, the contents of the dump car are discharged rearwardly therefrom into the receiving pit 6, between the widely spaced track rails 8, so that there is no possibility of the material discharged striking the rails, with resultant injury thereto. After the contents of the dump car 2, have been discharged, the draft upon the cable 3, is released, allowing the transfer truck 10, and dump car 2, to move downwardly on the rails 9, into position on the rails 8, the dump car 2, being prevented from rolling off of the transfer truck by the hook latch lever 30. As the transfer truck moves into position on the rails 8, the plates 35, on the end of the connected bars 34, strike against the transverse I-beam 12, thereby throwing the crank arm 33, forwardly to depress the latch lever 30, and release the front axle of the dump car. Also, the latch lever 25, on the transfer truck, slides over the upper end of the transverse I-beam 12, and latches therewith to lock the transfer truck from movement. As the dump car continues its rearward movement along on the rails 11, of the transfer truck, onto its own rails 1, the front axle strikes the upright lever 38, thereby swinging the same rearwardly, as shown in dotted lines in Fig. 6, so that the rollers 42, are projected upwardly beneath the connected links or lever bars 34, elevating the same so that the roller 36, on the outer end thereof, tracks over the upper surface of the transverse beam 12, permitting the counterweight 32, to again throw the latch lever 30, upwardly into position to latch with the front axle of the dump car in the next dumping operation, as in the operation previously described.

I am aware that various details of construction may be varied through a wide range without departing from the principles of this invention, and I therefore do not purpose limiting the patent granted otherwise than necessitated by the prior art.

I claim as my invention:

1. In a device of the class described, a transfer truck, rails thereon, a dump car adapted to be drawn onto the rails on said transfer truck, abutments on the transfer truck against which the dump car is drawn to cause movement of the transfer truck with the dump car, and locking mechanisms for the transfer truck to retain the same from movement, released by mechanism operated by the dump car moving into position thereon.

2. In a device of the class described, a transfer truck, a dump car adapted to be drawn thereon, means on the transfer truck for co-action with the dump car to cause movement of the transfer truck with the dump car, locking mechanisms locking the transfer truck from movement, and means actuated by the dump car moving upon the transfer truck to release said locking mechanisms to permit movement of the transfer truck with the dump car thereon.

3. In a device of the class described, a transfer truck, a dump car adapted to be drawn thereon, means locking the dump car upon the transfer truck, locking mechanisms for the transfer truck adapted to be released to permit movement of the truck with the dump car by the dump car moving thereon, means for releasing the dump car locking means after a dumping operation to permit the dump car to move off of said transfer truck, and a mechanism for automatically restoring said dump car locking means to normal position by the movement of said dump car off of the transfer truck.

4. In a device of the class described, a transfer truck, means locking the same from movement, a dump car adapted to be drawn on said transfer truck, mechanisms for releasing said means by movement of the dump car onto said transfer truck to permit movement of the dump car and transfer truck, means on said transfer truck for holding the dump car in locked position thereon, releasing means therefor to permit the dump car to move off of said transfer truck after a dumping operation, and means pivoted on said transfer truck for restoring said dump car locking means to normal position to lockingly receive the dump car for its next operation.

5. In a device of the class described, a track, a dump car movable thereover, another track of wider gage than said first mentioned track, a transfer truck movable thereon, rails on said transfer truck of the same gage and adapted to register with said first mentioned track to receive the dump car thereon, and means for moving the truck by the dump car.

6. In a device of the class described, a transfer truck, rails thereon, a dump car adapted to be drawn over the rails on said transfer truck, a locking mechanism on the transfer truck adapted to interlock with the dump car drawn thereon, and locking means locking said transfer truck from movement releasable by movement of the dump car thereon.

7. In a device of the class described, track rails, a dump car, movable thereover, another set of track rails of wider gage, a transfer truck movable thereover, track rails on said transfer truck of the same gage as said first mentioned track rails adapted to receive the dump car moved thereon, means on the transfer truck to automatically lock the dump car thereon, mechanisms to lock the transfer truck from movement automatically released to release the transfer truck by movement of the dump car onto said transfer truck.

8. In a device of the class described, a transfer truck, rails thereon, a dump car adapted to be moved upon said transfer truck, abutments on the transfer truck adapted to receive the dump car thereagainst to cause movement of the transfer truck when a draft is exerted upon the dump car, means operating automatically to interlock with the dump car to hold the same upon the transfer truck, locking means to prevent movement of the transfer truck released by movement of the dump car thereon, said locking means operating automatically to again lock the transfer truck when the dump car is moved therefrom.

9. In a device of the class described the combination with a transfer truck, and rails thereon, of a dump car adapted to be moved upon the transfer truck on said rails, locking means for locking the dump car upon the transfer truck, means locking the transfer truck from movement, mechanisms connected thereto for automatically releasing the transfer truck locking means by movement of the dump car thereon, and releasing means on said transfer truck to release said dump car locking means to permit the dump car to move off of the transfer truck after the dump car has emptied.

10. In a device of the class described the combination with a transfer truck and rails thereon, of a dump car movable upon the rails of the transfer truck, locking mechanisms for locking the dump car upon the transfer truck, means co-acting with the dump car on the transfer truck to cause movement of the transfer truck with the dump car, a locking device to lock the transfer truck from movement automatically released by movement of the dump car thereon, and releasing mechanism for the automatic locking means for the dump car to release the same when the transfer truck is returned to initial position after movement with the dump car to discharge position.

11. In a device of the class described, the combination with a narrow gage track of a track of wider gage alined therewith, a dump car on the track of narrow gage, a transfer car on the track of wider gage, a track on the transfer car to register with the narrow gage track, and means for moving the dump car onto the transfer car and thereafter moving the transfer car by the dump car with the dump car supported thereon to a dumping position.

12. In an apparatus of the class described, the combination with a transfer truck having abutments, of a dump car arrested by said aubtments, and means connected to said dump car for drawing said car with said truck constrained to move therewith by said abutments.

13. In a structure of the class described, a transfer truck, a dump car adapted to be received thereon and to be carried thereby, means controlling the movement of the dump car, and the transfer truck as well, when the dump car is thereon, and interlocking devices between the dump car and transfer truck operating automatically to lock and release the dump car to and from the transfer truck during movements of the dump car and movements of the dump car and transfer truck.

14. In an apparatus of the class described, the combination with a transfer truck having aubtments and latch levers, of a dump car adapted to be drawn upon said truck, and having a part thereof automatically locked between said abutments and latch levers.

15. A conveying and dumping apparatus comprising a transfer truck, means for securing said truck in a predetermined position, a dump car, means for securing said car from rearward movement upon said truck, means acting directly upon said car to convey said car and truck, and coöperating means between said car and truck for operating the two first mentioned means during the operative movements of said apparatus.

16. In an apparatus of the class described, a transfer truck, a dump car carried thereon, coöperating devices betwen said car and truck to securely lock said car to said truck upon relative movement of the car in one direction, and means coacting with one of said devices to render said devices inoperative when said truck is in a predetermined position.

17. In an apparatus of the class described, the combination with a transfer truck, of a dump car carried thereby, means acting directly upon said car to convey said car and truck, automatically operated means for securing said car to the truck when said car is moving over the truck in one direction, and devices for releasing said automatically operated means when said transfer truck is returned to its starting position.

18. In an appartus of the class described, a transfer truck, a holding device mounted thereon, means for automatically holding said device in operative position, a movable body carried by said transfer truck and secured thereon by said holding device, an abutment and means coöperating with said abutment to automatically release said holding device when said truck is in proximity to said abutment, and means operated by movement of said body relative to said truck to restore said device.

19. In an apparatus of the class described, the combination with a transfer truck, of a stationary abutment, of a device secured to said truck and coöperating with said abutment to hold said truck in a predetermined position, of a car carried by said truck, and coöperating means between said car and truck to release said device and lock said car to said truck when said car is moved over said truck in one direction.

20. In an apparatus of the class described, the combination with a transfer truck, of a car carried thereby, of automatically operated means to lock said car on said truck, of a stationary device, and means on said truck coöperating with said device in a predetermined position of said truck to release said first mentioned means.

21. In an apparatus of the class described, the combination with a conveying platform, of a vehicle carried thereby, means for securing said platform against movement in a predetermined position, means for locking said vehicle on said platform, and means for unlocking both of said means at said predetermined position by the operative movements of said apparatus.

22. In an apparatus of the class described, a transfer truck adapted for to and fro movement, a movable body carried thereby, means for automatically locking said body to said truck, when said body is moved upon said truck to a predetermined position, and means for automatically releasing said automatic means when said truck has completed its to and fro movement.

23. In an apparatus of the class described, a transfer truck adapted for to and fro movement, means for locking said truck in starting position, a car adapted for movement upon said truck and to be carried thereby, devices for automatically releasing said means and locking said car upon said truck when said car is moved upon said truck, and means for rendering said car locking device inoperative when the transfer truck has completed its to and fro movement.

24. In an apparatus of the class described, a transfer truck adapted for to and fro movement, means for locking said truck in starting position, a car adapted for movement upon said truck and to be carried thereby, devices for automatically releasing said means and locking said car upon said truck when said car is moved upon said truck, means for rendering said car locking device inoperative when the transfer truck has completed its to and fro movement, and means for restoring said car locking device to operative position upon movement of said car from said truck.

25. The combination with a track, of a transfer truck having a track of narrower gage thereon movable over said first mentioned track, a dump car having wheels of the same gage as the track on the transfer truck and carried thereby, the width of said dump car being substantially less than the width of the first mentioned track whereby the dumpings of said car will be free from the first mentioned track, and means cooperating between said car and truck for locking said car upon said truck from movement therefrom.

26. In an apparatus of the class described, a track, a transfer truck movable thereon, a dump car of a substantially less width than said track carried by said truck, abutments on said transfer truck for arresting said dump car in its forward movement, and means connected to said dump car for drawing said car and truck.

27. In a device of the class described, the combination with a dump car, of means for operating the same, a truck located in the path of movement of said car, and means automatically interlocking said car and truck when said car passes upon said truck whereby said truck is constrained to travel with said car.

28. In a device of the class described, the combination with a dump car, of a transfer truck located in the path of movement of said car, coöperating means on said car and truck for automatically interlocking said car and truck when said car is moved upon said truck.

In witness whereof I have hereunto subscribed my name in the presence of two subscribing witnesses.

WILLIAM J. BLACK.

Witnesses:

LAWRENCE REIBSTEIN,
CHARLES W. HILLS, Jr.